Oct. 25, 1949.　　　　　E. R. ZIMMERMAN　　　　　2,485,800
FISHING REEL
Filed Oct. 10, 1947　　　　　　　　　　　　　　2 Sheets-Sheet 1
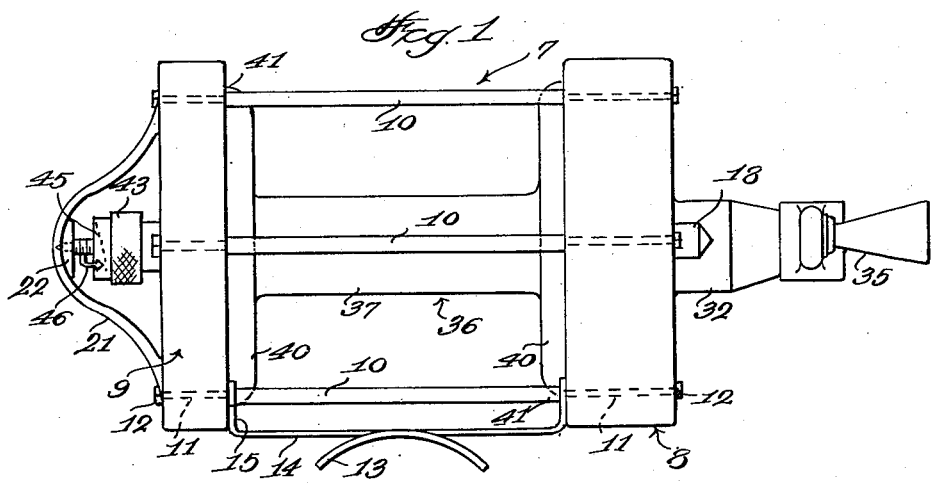
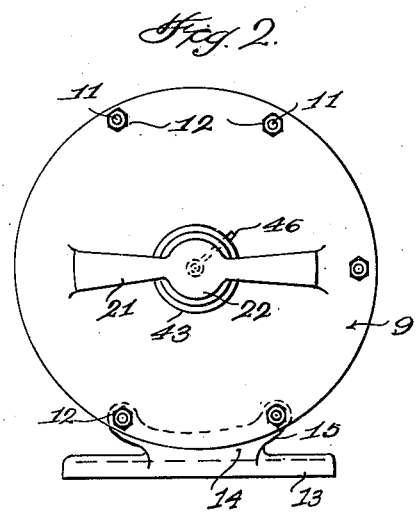 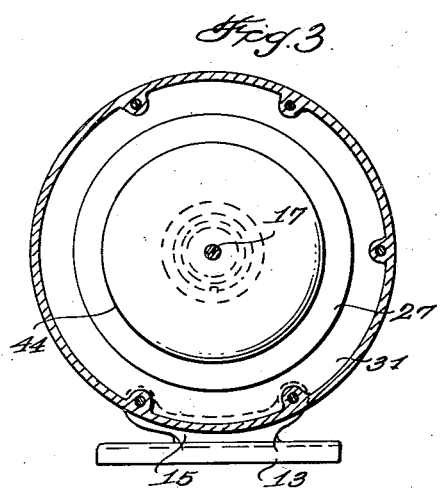
Inventor
Eugene R Zimmerman
By Randolph & Beavers
Attorneys

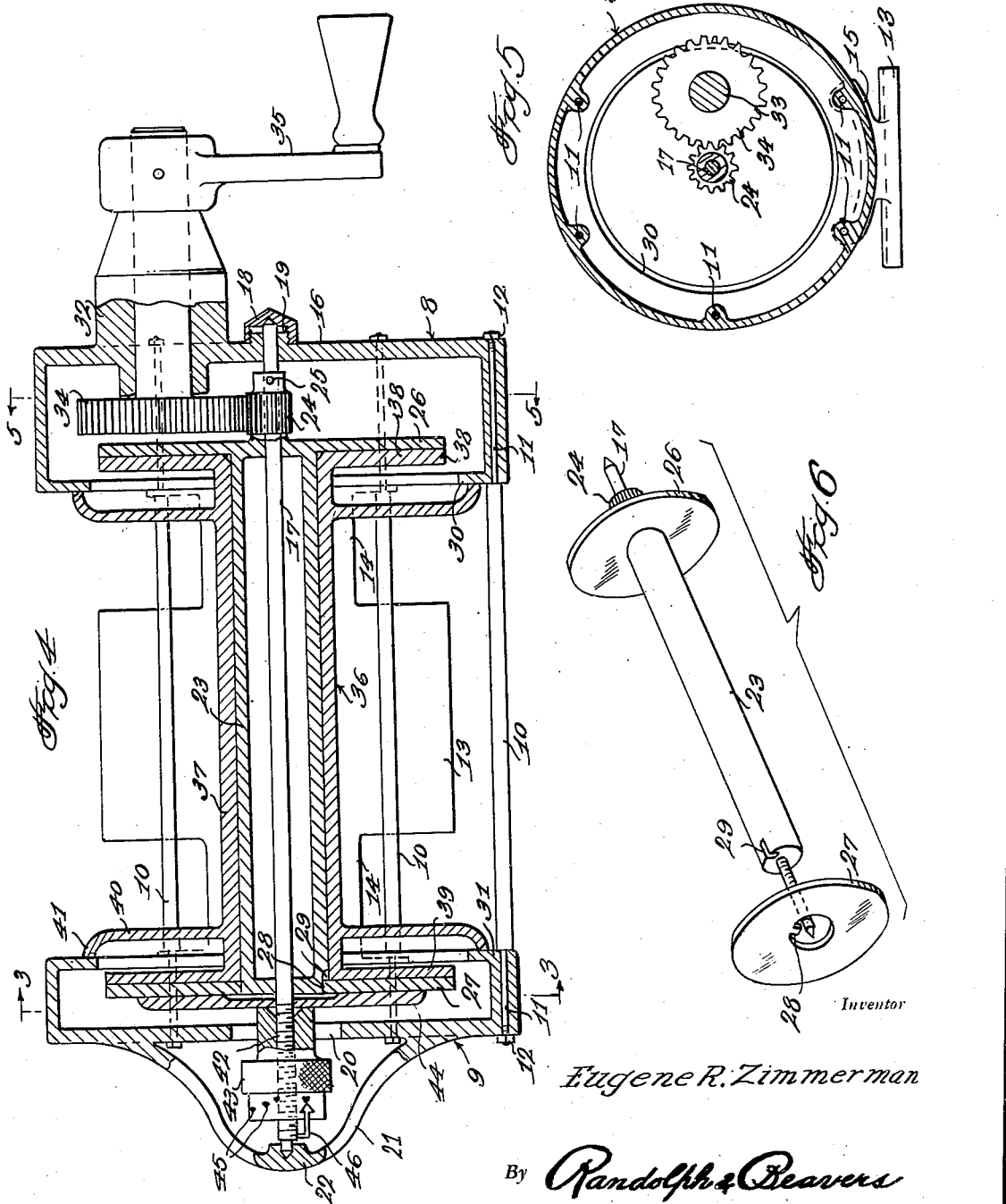

Patented Oct. 25, 1949

2,485,800

UNITED STATES PATENT OFFICE 2,485,800

FISHING REEL

Eugene R. Zimmerman, Beloit, Wis.

Application October 10, 1947, Serial No. 779,034

6 Claims. (Cl. 242—84.7)

This invention relates to an improved construction of fishing reel and more particularly to a reel of extremely simple construction which is capable of being economically manufactured and sold, which may be readily assembled and disassembled for cleaning and lubricating and which will be extremely durable.

More particularly, it is an object of the present invention to provide a fishing reel having a drag of simple construction which may be manually adjusted for varying the pull required to cause the spool to slip relatively to the crank and wherein the weight required to cause slippage of the spool will be visually indicated for the benefit of the user.

Numerous other objects and advantages of the invention will hereinafter become more fully apparent from the following description of the drawings, illustrating a presently preferred embodiment thereof, and wherein:

Figure 1 is a side elevational view of the fishing reel;

Figure 2 is an end elevation thereof looking from left to right of Figure 1;

Figure 3 is a sectional view taken substantially along a plane as indicated by the line 3—3 of Figure 4;

Figure 4 is an enlarged horizontal and substantially central sectional view of the reel;

Figure 5 is a cross sectional view thereof taken substantially along a plane as indicated by the lines 5—5 of Figure 4, and Figure 6 is an exploded perspective view of a portion of the reel spool.

Referring more specifically to the drawings, the improved fishing reel in its entirety and comprising the invention is designated generally 7 and includes a pair of hollow end members or heads, designated generally 8 and 9 which are detachably connected in spaced relationship by a plurality of tie rods 10 each of which is provided with restricted threaded ends 11 which extend through openings in peripheral portions of the heads 8 and 9 and are detachably engaged therebeyond by nuts 12 for detachably connecting the heads 8 and 9 in properly spaced relationship to one another.

The reel 7 includes a elongated bar or plate of arcuate cross section as seen at 13 which is adapted to be attached in a conventional manner to a fishing rod, not shown, and which is provided with lateral extensions or brackets 14 having upstanding apertured free ends 15 through which certain of the extensions 11 of two of the tie rods 10 extend to demountably attach the plate 13 to the reel heads 8 and 9.

The reel head 8 is of a width greater than the reel head 9 and has a centrally disposed bearing 16 in the outer wall thereof for journaling one end of a shaft 17 which end extends therethrough and has a tapered terminal which is journaled in a similarly shaped recess of a thrust bearing cap 18 which is detachably and threadably mounted on an external nipple 19 of the bearing 16.

The outer wall of the end member or head 9 is provided with a central opening 20 and includes an outwardly bowed bail portion 21 which projects from said outer wall and has a centrally disposed thrust bearing portion 22 in which the opposite end of the shaft 17 is journaled.

A spindle or sleeve 23 is disposed on the shaft 17 and has end walls provided with central openings through which the shaft 17 extends. A pinion 24 which is preferably formed integral with one of the end walls of the spindle 23 and which is disposed in the head 8 is fixed to the shaft 17 as by means of a pin or set screw 25 whereby the spindle and pinion 24 are both fixed to the shaft 17. Said end wall of the spindle 23, located adjacent to the pinion 24, is provided with a relatively large disc or flange 26 which is fixed thereto and preferably formed integral therewith. The opposite end of the spindle 23 is provided with an annular disc or plate 27 which is detachably connected and slidably keyed thereto by an inwardly projecting key thereof as seen at 28 that slidably engages the longitudinal groove 29 in the spindle 23, for a purpose that shall hereinafter become apparent. The inner, adjacent walls 30 and 31 of the heads 8 and 9, respectively, are provided with large openings through which the members 26 and 27 are passable so that said members, when the reel 7 is assembled, are disposed within the hollow interiors of the heads or end members 8 and 9.

The outer wall of the head 8 is provided with a bearing 32 which is eccentrically disposed with respect thereto and preferably located in substantially the same horizontal plane as the bearing 16 for journaling a shaft 33 which extends therethrough and the inner end of which is disposed within the head 8 and has a gear 34 fixed thereto and disposed to mesh with the pinion 24. The opposite, outer end of the shaft 33 protrudes beyond the outer end of the bearing 32 has a reel crank 35 detachably fixed thereto for rotating the tub-shaft 33 and gear 34 to turn pinion 24, shaft 17 and the spindle 23.

The spool, designated generally 36 of the reel 7, includes an elongated drum or hub 37 which is rotatably disposed on the spindle 23 and which is provided with complementary end flanges 38 and 39 for engagement against the inner sides of the end flanges or plates 26 and 27, respectively. The spool 36 also includes corresponding flanges 40 of annular formation which project outwardly from the drum 37 adjacent to the end flanges 38 and 39 and which are provided with outwardly curved peripheral portions 41 the free edges of which are disposed inwardly of and adjacent the inner walls 30 and 31 and outwardly of the enlarged openings thereof. As clearly illustrated in Figure 4, the end flanges 38 and 39 are likewise disposed within the cavities of the heads 8 and 9, respectively.

The end portion of the shaft 17, located adjacent the terminal thereof which is journaled in the bearing 22, is threaded as seen at 42 for receiving a nut 43 having a knurled portion which is disposed outwardly of the outer end wall of the head 9 and within the bail-like portion 21 and which nut is provided with an inner portion which extends inwardly through the opening 20 of the head 9 to bear against a pressure plate or disc 44 which is rotatably and slidably disposed on the shaft 17 for bearing engagement against the annular plate or disc 27. The outer end portion of the nut 43, which is located outwardly of the knurled portion thereof is provided with suitable indicia or graduations 45 on the periphery thereof for indicating the number of pounds of pull required to rotate the spool 36 relatively to the spindle 23, as will hereinafter become apparent. The shaft 17 is provided with an indicating pointer 46 which projects from the threaded portion 42 thereof and which has a portion overlying the calibrations or indicia 45.

From the foregoing it will be readily apparent that if the nut 43 is turned in a direction for advancing it inwardly of the head 9 that in so moving it will force the pressure plate 44 into engagement with the slidably mounted disc 27 to cause said disc to slide inwardly on the spindle 23 for thereby clamping the spool flanges 38 and 39 between the end members or plates 26 and 27 for frictionally connecting the spool 36 to the spindle 23 so that said spool will be revolved with the spindle and shaft 17 when the crank 35 is manually turned. Conversely, if the nut 43 is backed off so that it does not hold the pressure plate 44 against the disc 27, it will be readily apparent that the spindle 23 and spool 36 can turn relatively to each other. Accordingly, by varying the extent that the nut 43 is advanced the amount of pull required on the spool 36 to cause it to rotate relatively to the spindle can be varied and the weight of this pull will be indicated by the calibration 45 which aligns with the pointer 46 so that said nut and pressure plate combine with the spool and spindle parts to form a variable drag for the reel 7, thus producing a reel of extremely simple construction equipped with an adjustable drag or brake and which may be readily assembled or disassembled and which is likewise capable of being readily lubricated and cleaned.

Various modifications and changes are contemplated which may obviously be resorted to, without departing from the spirit or scope of the invention as hereinafter defined by the appended claims.

I claim as my invention:

1. A fishing reel comprising a reel frame, a shaft journaled axially therein, a spindle detachably keyed to said shaft, manually actuated means for rotating said shaft and spindle, a reel spool rotatably mounted on said spindle and provided with end flanges, an end flange fixedly disposed on one end of said spindle, an end flange slidably keyed to the opposite end of said spindle, the end flanges of the spool being disposed between the end flanges of the spindle, a clutch pressure plate slidably and rotatably disposed on said shaft for bearing engagement with the outer side of said slidably keyed spindle flange, said shaft having a threaded portion disposed outwardly of the clutch pressure plate, and a manually adjustable nut threaded thereon for engagement with the clutch pressure plate for variably clamping the spool flanges between the spindle flanges.

2. A reel as in claim 1, said reel frame including hollow end members or heads in which the spool and spindle flanges are disposed and provided with enlarged openings in the inner walls thereof through which said flanges are passable.

3. A reel as in claim 1, said frame including hollow end members or heads in which the ends of said shaft are journaled, one of said heads having an outwardly projecting bail like portion provided with a centrally disposed bearing for journaling one end of said shaft, and said nut having a portion thereof disposed within said bail like portion and in an exposed position to be manually engaged for adjustably positioning the clutch pressure plate.

4. A reel as in claim 1, said reel frame including hollow end members or heads in which the spool and spindle flanges are disposed and provided with enlarged openings in the inner walls thereof through which said flanges are passable, said frame including hollow end members or heads in which the ends of said shaft are journaled, one of said heads having an outwardly projecting bail like portion provided with a centrally disposed bearing for journaling one end of said shaft, and said nut having a portion thereof disposed within said bail like portion and in an exposed position to be manually engaged for adjustably positioning the clutch pressure plate.

5. A fishing reel as in claim 1, said frame including hollow end members or heads, a plurality of tie rods for detachably connecting said heads in spaced, aligned relationship, and a fishing rod engaging bracket detachably connected to certain of said tie rods and detachably mounted thereby on the reel frame.

6. A reel as in claim 1, said reel frame including hollow end members or heads in which the spool and spindle flanges are disposed and provided with enlarged openings in the inner walls thereof through which said flanges are passable, said spool being provided with a pair of flanges spaced inwardly from the first mentioned flanges thereof and having outwardly curved peripheral portions extending to adjacent the inner walls of the reel frame head and disposed outwardly of the openings thereof for substantially covering the openings.

EUGENE R. ZIMMERMAN.

No references cited.